United States Patent [19]
Whitford

[11] Patent Number: 4,827,994
[45] Date of Patent: May 9, 1989

[54] BARREL SHAVER

[75] Inventor: Darryl R. Whitford, Rosedale, Australia

[73] Assignee: S. Smith & Son Pty. Ltd., Australia

[21] Appl. No.: 97,473

[22] Filed: Sep. 16, 1987

[30] Foreign Application Priority Data

Sep. 18, 1986 [AU] Australia .................... PH8067

[51] Int. Cl.⁴ .............................................. B27C 9/00
[52] U.S. Cl. .................................. 144/2 R; 51/123 R; 51/290; 82/1.2; 82/113; 144/115; 144/134 R; 144/356; 144/365
[58] Field of Search .............. 144/2 R, 134 R, 134 A, 144/134 B, 365, 371, 115, 356, 357; 51/123 R, 240; 82/1.2, 4 C

[56] References Cited

U.S. PATENT DOCUMENTS 942,081 12/1909 Kinyon .............................. 144/2 R
1,461,376 7/1923 Bartlett ............................ 144/2 R Primary Examiner—W. Donald Bray
Attorney, Agent, or Firm—Brown, Martin, Haller & McClain

[57] ABSTRACT

A wooden wine barrel has one end removed, and is supported by and rotated by power driven support wheels. A router type cutter head extends into the barrel on an inner end of an arm which is pivoted at its outer end so that the cutter head can follow the contour of the barrel, and means to move the barrel longitudinally with respect to the arm (or vice versa) to effect relative longitudinal movement between the arm and barrel.

10 Claims, 3 Drawing Sheets

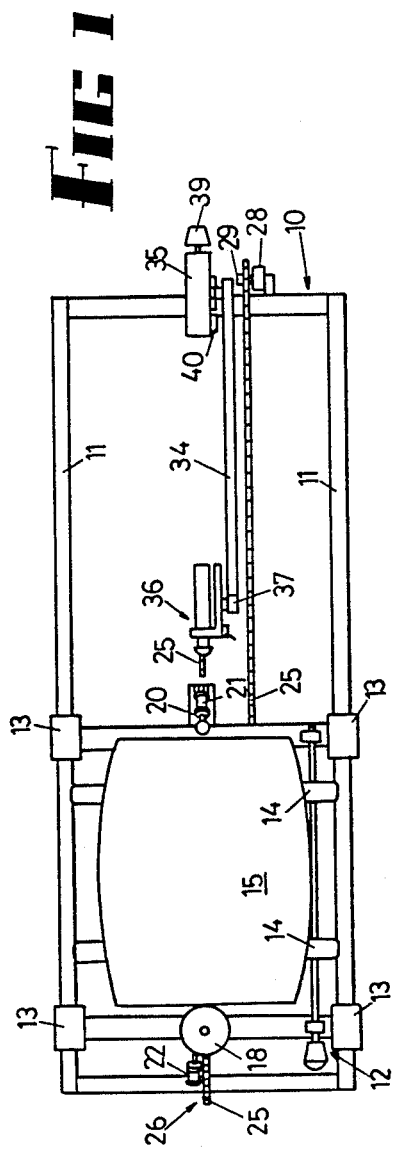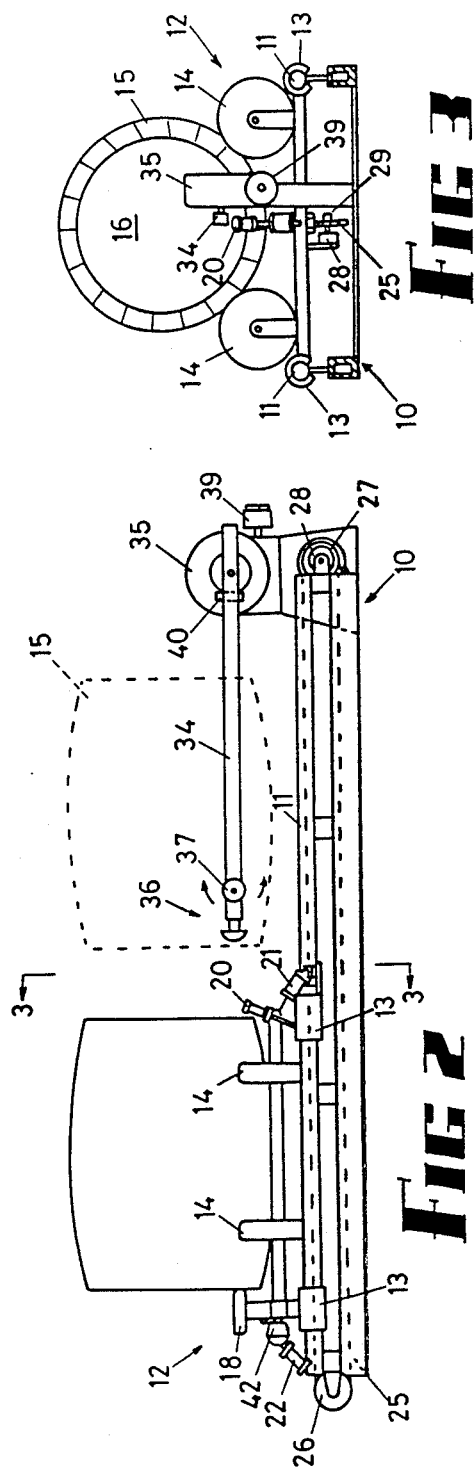

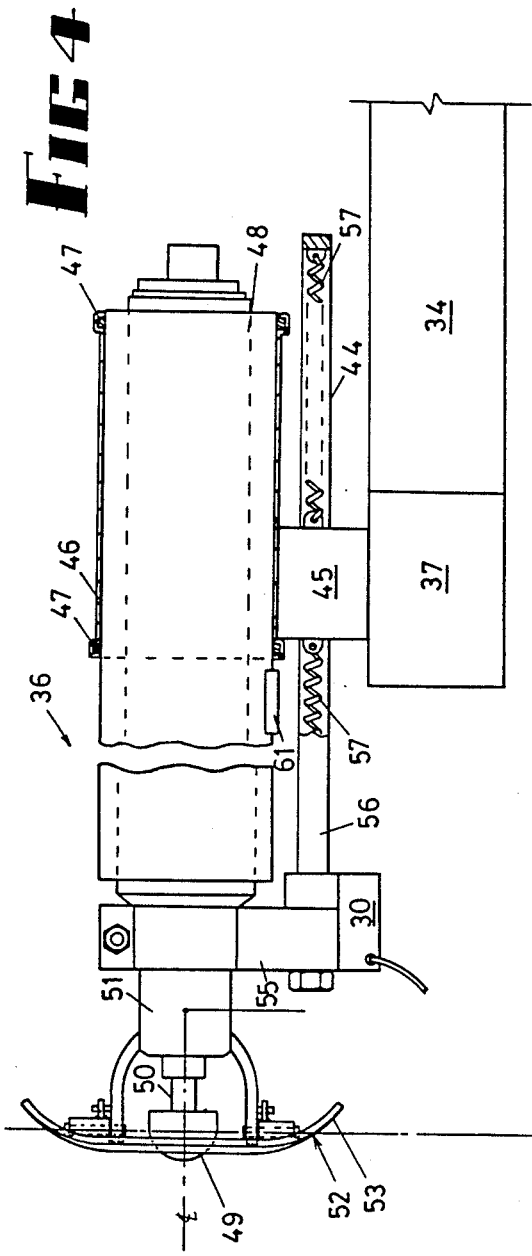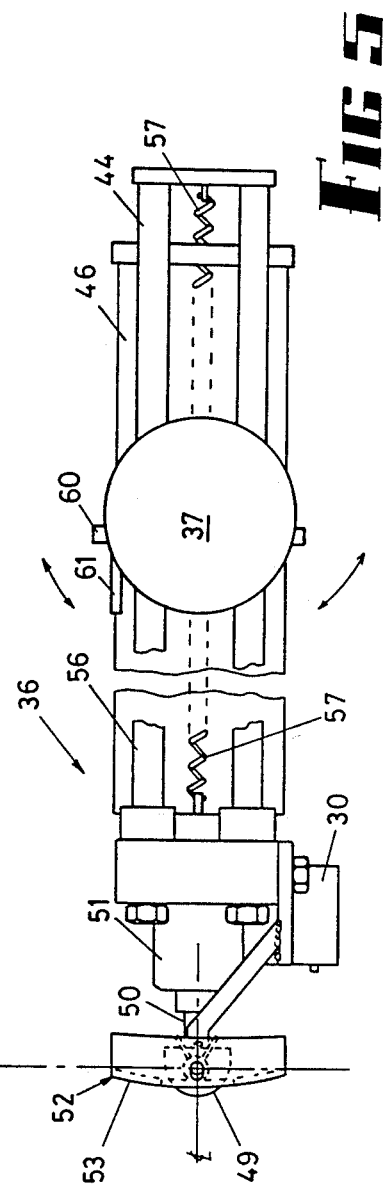

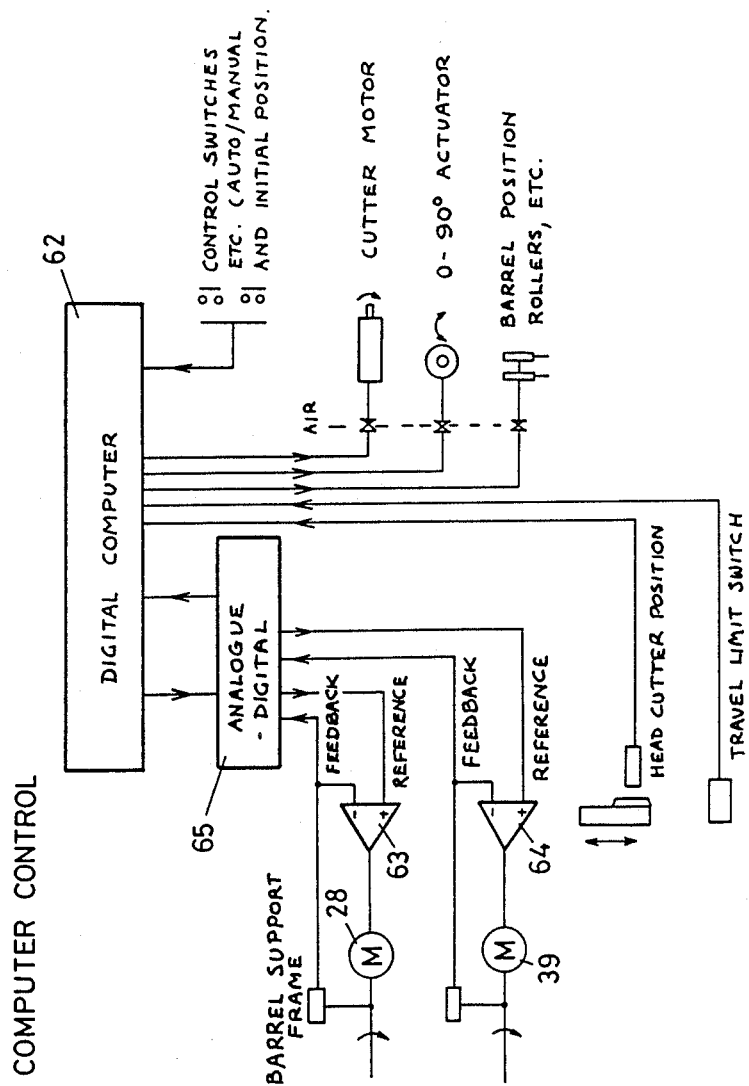

BARREL SHAVER

This invention relates to a machine for removing a layer of wood and wine residue from inside a wooden wine barrel.

BACKGROUND OF THE INVENTION

When wine barrels are continuously used, the inner surfaces become contaminated with wine residue, and the much sought after "wood flavour" becomes less and less available. Accordingly, sometimes it is necessary to discard wine barrels when there is still a considerable thickness of wood left, and the main object of this invention is to provide a means and a method of removing a small thickness of the wood together with the wine residue from the interior surface of the barrel.

In a large winery there are very large numbers of barrels, and the removal of wood from the interior of the barrel could be a time-consuming and tedious operation, and the secondary object of the invention is to provide a machine which is capable of removing the wood from the barrel in an automatic process, giving accurate control over depth and speed of cutting. If accurate controls are used over the depth of cutting it is possible to provide an increased life of the barrel by removing only the required amount of wood, whereas manual removal of the wood can tend to be a little haphazard, and cause excessively deep cuts in some areas.

BRIEF SUMMARY OF THE INVENTION

In this invention, a wooden wine barrel has one end removed, and is supported by and rotated by power driven support wheels. A router type cutter head extends into the barrel on an inner end of an arm which is pivoted at its outer end so that the cutter head can follow the contour of the barrel, and means to move the barrel longitudinally with respect to the arm (or vice versa) to effect relative longitudinal movement between the arm and barrel.

More particularly the invention relates to a machine comprising a main frame assembly, barrel support means on the frame supporting a barrel for rotation, drive means coupled to said barrel to effect said barrel rotation, a cutter head assembly comprising a cutter motor, a router type cutter head coupled to a drive shaft of the cutter motor, an arm having one end supporting said cutter head assembly, means supporting the other end of the arm for pivotal movement relative to the frame, and means carried by the frame for so effecting relative longitudinal movement between the barrel and arm that the cutter head can traverse the inner surface of a rotating barrel and thereby remove a layer of wood and wine residue therefrom.

With this invention, any one of a number of control means can be used for controlling depth of cut, and can be very accurate.

DESCRIPTION OF THE PREFERRED EMBODIMENT

An embodiment of the invention is described hereunder in detail with reference to and is illustrated in the accompanying drawings in which:

FIG. 1 is a plan of a barrel shaver;
FIG. 2 is a side elevation of FIG. 1;
FIG. 3 is an end elevation of FIG. 2;
FIG. 4 is a partly sectioned plan of the cutter head assembly;
FIG. 5 is a side elevation of FIG. 4; and
FIG. 6 is a block diagram indicating one control method which can be used for controlling operation of the machine.

Referring first to FIGS. 1, 2 and 3, a main frame assembly 10 has a pair of spaced parallel rods 11, and a barrel support frame 12 has linear bearings 13 which slidably engage the longitudinal rods 11 of the frame 12. Rubber wheels or rubber tyred wheels 14 support a barrel 15 for rotation, the wheels 14 being driven as disclosed below. In some instances, both ends are removed from a barrel and in other instances the barrel has one end left in, and as shown in the drawings the end 16 of the barrel 15 remains on the barrel. An idler wheel 18 bears against the barrel end 16 to retain position of the barrel end during cutting of the inner surface of the end 16, and resists any longitudinal displacement.

A second rubber roller 20 is held against the open front of the barrel 15 to hold it in position on the wheels 14, by a small retraction air cylinder 21 which also retracts the rubber roller 20 when it is required to remove the barrel 15 from its wheels 14. The wheel 18 is similarly retractable by a second retraction cylinder 22.

The complete barrel assembly situated on barrel support frame 12 is moved in a controlled linear movement by chain 25 running between the idler sprocket 26 and a driving sprocket 27 on a travel servo motor 28. A position sensor switch 29 is used to control the precise position and movement rate of the barrel support frame 12, and a position sensor switch 30 is used to control the position and depth of cut of the cutter head assembly, as described below.

An arm 34 extends into the barrel 15 from a gearbox 35, and carries on its projecting end a cutting head assembly 36 itself on a 90° actuator 37. The angle of the arm is controlled by the gearbox 35, itself driven by a servo motor 39, and by a position control switch 40. The arm position and its speed and movement is controlled by the gearbox 35, switch 40 and servo motor 39.

Although use can be made of depth sensing switches, limit switches and other well known devices, a computer controlled servo system (illustrated in block form in FIG. 6) is employed in this embodiment and controls the positions of both the barrel support frame 12 and the arm 34, and barrel rotation, according to a sequence which is programmed to provide the required depth of cutting. Once the cutting head has made contact with the inner surface of the barrel, the computer continuously senses the head position and tracks the contours of the barrel 15, accepting signals from sensor switch 30. This type of control is not new for control of machine tool operation.

Reference is now made to the cutter head assemblies illustrated in more detail in FIGS. 4 and 5.

Actuator 37 is supported by the end of arm 44, and its output shaft attached to a sleeve 46 which is provided with a pair of felt wiper rings 47 at its two ends. The sleeve 46 slidably supports an air motor 48 coupled to a router cutter 49 by an output shaft 50 journalled in bearings in a bearing housing 51. A shoe 52 has a curved outer surface 53 which rides over the surface of the wooden staves within the wine cask and controls depth of cut, the router cutter 49 extending outwardly through a central aperture in the shoe.

A clamp 55 clamps a guide frame 56 to the housing 51, and springs 57 co-act between the output shaft 45 of the actuator 37, and the frame 56. Sensor switch 30 is carried on the frame 56. The springs provide pressure and resilience for the cutter 49 and the shoe 52 during the cutting operation. A proximity detector 60 on the sleeve 46 detects a strip of metal 61 when the clamp 55 has moved about 50% of its available travel with respect to the guide frame 56.

In operating, the following sequence occurs:
1. The barrel 15 is rotated on its support frame 12 by the small barrel turning motor 42 (left hand side FIG. 1).
2. The arm 34 is elevated so that the cutting head assembly 36 is at the centre of the barrel. (FIG. 1).
3. The support frame 12 is moved towards the cutting head assembly 36 until the cutting head and air motor is caused to move by about half of its travel in sleeve 46, against the action of the springs 57 which is illustrated in FIGS. 4 and 5, compressing the springs 57.
4. When half the travel has been reached, the linear movement of the barrel support frame 12 stops, and the position of the frame is controlled in such a manner as to keep the cutting head in the centre of its travel with respect to sleeve 46.
5. The arm 34 is then slowly moved in a downward direction as the motor 42 causes rotation of barrel 15, to cut an overlapping spiral on the inner face of the barrel end 16.
6. Downward movement continues until the sensor switch 30 identifies the position by contacting the curved inner faces of barrel 16.
7. The barrel support frame 12 is then restricted a small distance (about 100 mm), the arm 34 is raised again to the centre of barrel 15, the cutting head assembly 36 is rotated 90° to a downward position by the 90° actuator 37.
8. The support frame 12 is then moved forwardly towards the barrel end 16 until the sensor switch 30 is engaged by the inner face of the end 16.
9. The barrel support frame 12 is then slowly retracted, causing the cutting head assembly 36 to cut an overlapping spiral around the inside of the curved wall of barrel 15. This retraction continues until a preset distance is reached, this distance having been programmed in the computer.
10. During operation in sub-paragraph 9 above, the servo control switch 40 (FIGS. 1 and 2) controls the arm tilt servo motor 39 which in turn controls the angle of the arm 34 to keep the deflection of the springs 57 to a degree corresponding to one half the travel of the cutting head assembly in its sleeve 46. In this manner the curvature of the barrel is followed.
11. At the end of the travel of the cutting head in the operation in sub-paragraph 9 above, the arm 34 is again lifted to a horizontal position in the centre of barrel 15, and the actuator 37 again rotates the cutting head assembly 36 to be coaxial with the arm 34, and the barrel support frame 12 is retracted back to its start position. The barrel 15 is then rejected and a new barrel is inserted and the cycle repeated.

Reference is now made to the computer which is illustrated in block diagram form in FIG. 6.

The digital computer 62 is connected to accept input control switching for on/off control, inputting arm centre and cutting length. The outputs drive air solenoids (not shown) to control the cutter motor, the actuator and the barrel position cylinders.

The two DC servo motors 28 and 39 are provided with position feedback elements to position respectively the barrel support frame 12 the arm 34, and are connected through respective servo amplifiers 63 and 64. An analogue-digital (and digital-analogue) converter 65 allows the computer to identify where the carriage or arm is, and to control its position by outputting an analogue voltage to the appropriate servo motor.

The computer programme is a sequential-step programme which at the appropriate sequence, will use the head centre distance to halt and control movement of the carriage or arm to maintain the head at its 50% travel location. The position sensor switch 30 is used to signal the end of cutting of the barrel, or inward movement prior to cutting the side walls. Feedback from the carriage and arm position is used to control the speed and/or position of each servo motor 28 and 39 to effect the quick movement for positioning, or the slow controlled movement for cutting.

I claim:
1. A barrel shaver for removing a layer of wood and wine residue from the inside surface of a timber wine barrel, comprising a main frame assembly,
   barrel support means on the frame supporting a barrel for rotation, drive means coupled to said barrel to effect said barrel rotation,
   a cutter head assembly comprising a cutter motor, a router type cutter head coupled to a drive shaft of the cutter motor, an arm having one end supporting said cutter head assembly, means supporting the other end of the arm for pivotal movement relative to the frame,
   and means carried by the frame for so effecting relative longitudinal movement between the barrel and arm that the cutter head can traverse the inner surfaces of a rotating barrel and thereby remove a layer of wood and wine residue therefrom.
2. A barrel shaver according to claim 1 wherein said barrel support means comprises a plurality of spaced wheels on axles, said drive means driving at least one of those wheels for rotation so that a barrel, when supported on said wheels, is rotated thereby.
3. A barrel shaver according to claim 2 wherein said barrel support means comprises two said axles which are parallel and spaced from each other, two said wheels spaced from one another on each of said axles, and further comprising rubber tyres on respective said wheels.
4. A barrel shaver according to claim 2 wherein said barrel support means further comprises a barrel support frame carrying bearings thereon in which said axles are journalled.
5. A barrel shaver according to claim 2 wherein said drive means comprises a motor coupled to a said wheel axle.
6. A barrel shaver according to claim 1 wherein said main frame assembly comprises a pair of spaced longitudinal rods, said barrel support means comprises a frame having a plurality of linear bearings movable along those rods, and said longitudinal movement means comprises a travel servo motor and sprockets on the main frame assembly and a chain coupling the sprockets to the barrel support frame.
7. A barrel shaver according to claim 6 wherein said main frame assembly further comprises a gearbox having a tilting servo motor coupled to an input shaft thereof and said arm carried by an output shaft thereof.
8. A barrel shaver according to claim 7 wherein said cutter head assembly further comprises a motor, bearing housing, shaft and router cutter carried by an output shaft of a 90° actuator, said actuator being on a swinging end of said arm.

9. A barrel shaver according to claim 7 wherein said cutter head assembly further comprises a shoe having a central aperture, and a router cutter extending outwardly through that aperture.

10. A barrel shaver according to claim 7 further comprising:

guide means supported by one end of said arm, said guide means positioned such that said cutter head assembly is relatively axially movable thereto and constrained thereby; and a spring co-acting between said cutter head assembly and said guide means for applying pressure and resilience between said cutter head assembly and the inner surface of the barrel when the barrel is being shaved by said router cutter.

* * * * *